United States Patent
Iijima et al.

(10) Patent No.: US 9,723,221 B2
(45) Date of Patent: Aug. 1, 2017

(54) IMAGING DEVICE SHOOTING A COMMON SUBJECT IN SYNCHRONIZATION WITH OTHER IMAGING DEVICES

(71) Applicant: CASIO COMPUTER CO., LTD., Shibuya-ku, Tokyo (JP)

(72) Inventors: Jun Iijima, Tokorozawa (JP); Kazuya Nara, Hachioji (JP); Kouichi Saitou, Iruma (JP); Toshiya Kiso, Hamura (JP); Takuya Yamada, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/818,532

(22) Filed: Aug. 5, 2015

(65) Prior Publication Data
US 2016/0050357 A1    Feb. 18, 2016

(30) Foreign Application Priority Data
Aug. 12, 2014   (JP) ................. 2014-164005

(51) Int. Cl.
*H04N 5/232* (2006.01)
*H04N 5/225* (2006.01)
*G06K 9/00* (2006.01)
*H04N 5/247* (2006.01)

(52) U.S. Cl.
CPC ......... *H04N 5/247* (2013.01); *H04N 5/23203* (2013.01)

(58) Field of Classification Search
CPC ... H04W 4/008; H04N 5/23216; H04N 13/02; G08B 13/1963; G08B 13/1968; G08B 13/19643; G03B 35/00

USPC .............. 348/211.1, 211.2, 211.3, 207.1, 46; 382/154; 705/105; 709/208; 725/105
See application file for complete search history.

(56) References Cited

U.S. PATENT DOCUMENTS

| 7,649,551 | B2 * | 1/2010 | Ohmura ............ H04N 1/00127 348/14.05 |
| 2004/0017486 | A1 * | 1/2004 | Cooper ................. H04N 5/073 348/211.1 |
| 2005/0033835 | A1 * | 2/2005 | Kinjo ..................... G08C 17/00 709/223 |

(Continued)

FOREIGN PATENT DOCUMENTS

| JP | 2003324649 A | 11/2003 |
| JP | 2004128646 A | 4/2004 |
| JP | 2010004464 A | 1/2010 |

*Primary Examiner* — Xi Wang
(74) *Attorney, Agent, or Firm* — Holtz, Holtz & Volek PC

(57) ABSTRACT

An imaging device shoots a common subject in synchronization with other imaging devices. The imaging device includes a processor. The processor receives states of the other imaging devices, compare an own state of the imaging device with the received states of the other imaging devices, and determine whether the imaging device functions as a main device or a subordinate device for setting an imaging condition. When the processor determines that the imaging device functions as the main device, the processor sends imaging information acquired or determined by the imaging device for shooting the common subject to the subordinate devices. When the processor determines that the imaging device functions as the subordinate device, the processor sets the imaging condition in the imaging device based on the imaging information received from the main device.

15 Claims, 9 Drawing Sheets

(56) References Cited

U.S. PATENT DOCUMENTS

2007/0147827 A1* 6/2007 Sheynman ............. G03B 29/00
396/325
2008/0036871 A1* 2/2008 Ohmura ............. H04N 1/00127
348/222.1
2011/0205380 A1* 8/2011 Shirakawa ............. H04N 5/247
348/211.9

* cited by examiner

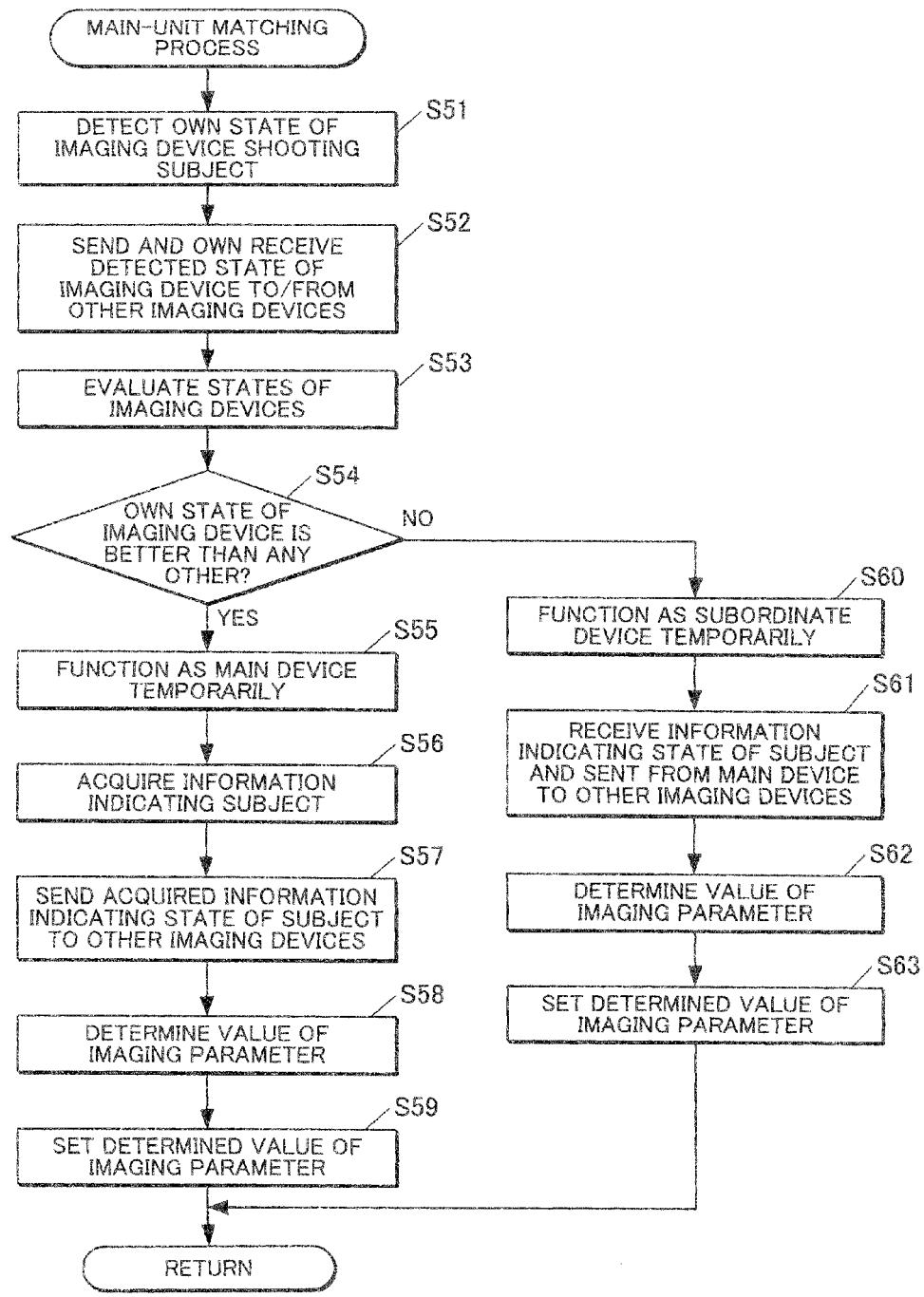

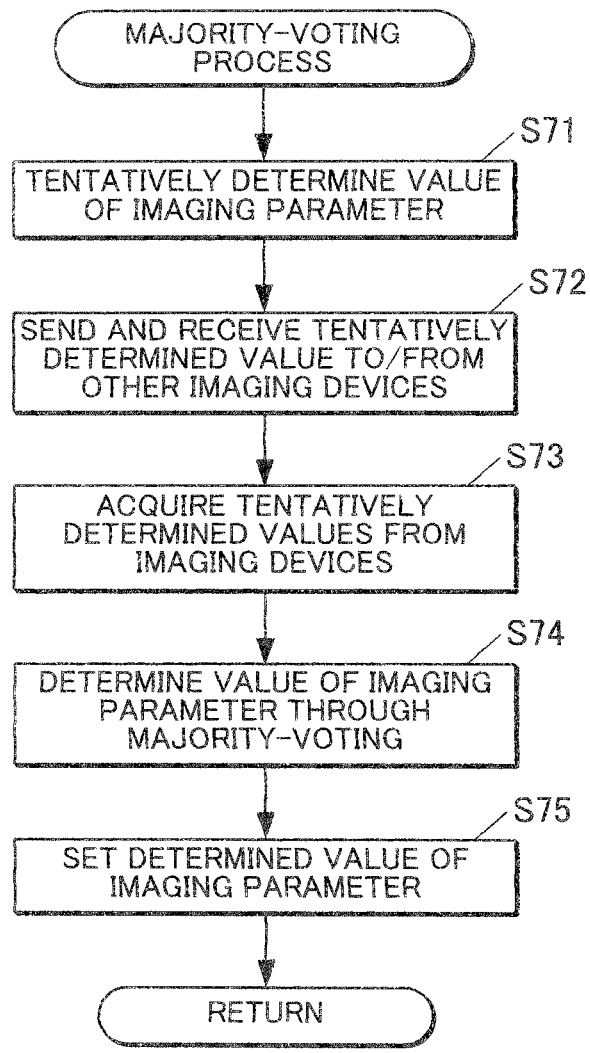

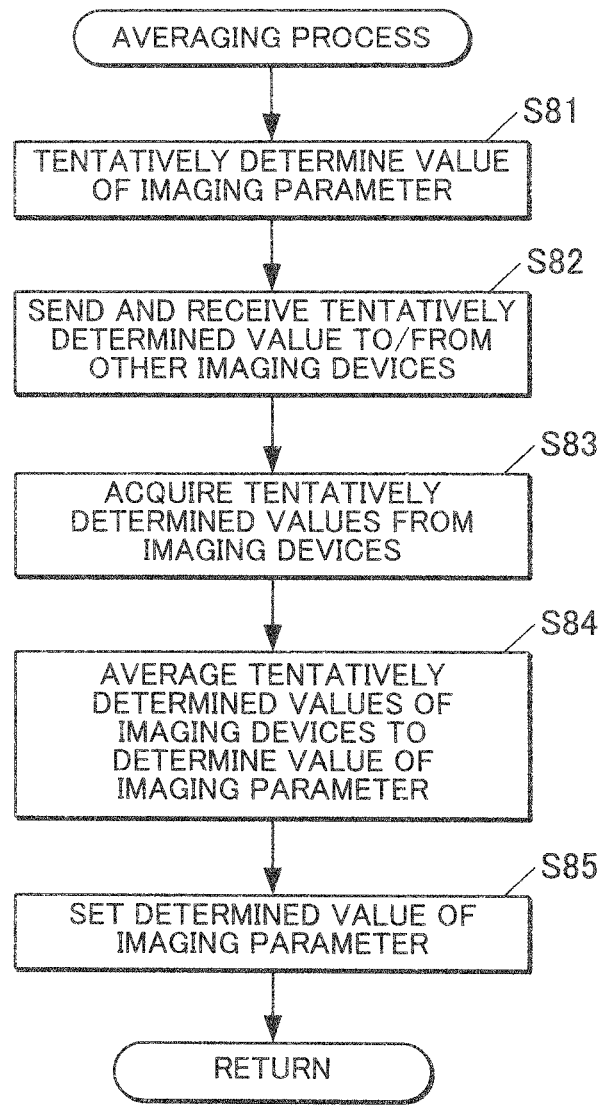

IMAGING DEVICE SHOOTING A COMMON SUBJECT IN SYNCHRONIZATION WITH OTHER IMAGING DEVICES

CROSS REFERENCE TO RELATED APPLICATION

This application is based upon and claims the benefit of priority under 35 USC 119 of Japanese Patent Application No. 2014-164005 filed on Aug. 12, 2014, the entire disclosure of which, including the description, claims, drawings and abstract, is incorporated herein by reference in its entirety.

BACKGROUND OF THE INVENTION

1. Field of the Invention

The present invention relates to an imaging device, a shooting system, and a method for shooting a common subject in synchronization with other imaging devices.

2. Description of the Related Art

A system is known which has imaging devices synchronously shooting a common subject (See, for example, Japanese Unexamined Patent Application Publication No. 2003-324649). In this system, a main imaging device acquires the imaging conditions of other subordinate imaging devices and then comprehensively evaluates these conditions to determine common imaging conditions applicable to all the imaging devices. The main imaging device sends the determined imaging conditions to the subordinate imaging devices. Each imaging device sets the received imaging conditions.

SUMMARY OF THE INVENTION

According to a first aspect of the present invention, there is provided an imaging device that shoots a common subject in synchronization with another imaging device, including:
an imaging unit;
a wireless processing unit; and
a processor,
wherein the processor receives a state of the other imaging device shooting the common subject through the wireless processing unit, compare an own state of the imaging device with the received state of the other imaging device, and determine whether the imaging device functions as a main device or a subordinate device for setting an imaging condition in accordance with the comparison,
wherein, when the processor determines that the imaging device functions as the main device, the processor sends imaging information acquired or determined by the main device for shooting the common subject to the subordinate device through the wireless processing unit, and
wherein, when the processor determines that the imaging device functions as the subordinate device, the processor sets the imaging condition in the subordinate device based on the imaging information received from the main device through the wireless processing unit and the imaging unit images the common subject synchronously.

According to a second aspect of the present invention, there is provided a method for shooting a common subject in synchronization with imaging devices, including the steps of:
sending and receiving a state of the imaging device shooting the common subject to and from another imaging device;
comparing the states of the imaging devices, the states being sent and received; and
selecting a main device and a subordinate device for setting an imaging condition of the common subject based on the comparison,
wherein the main device sends imaging information acquired or determined by the main device for shooting the common subject to the subordinate device, and
wherein the subordinate device sets an imaging condition of the subordinate device based on the imaging information received from the main device and images the common subject synchronously with the imaging unit.

According to a third aspect of the present invention, there is provided an imaging system shooting a common subject in synchronization with imaging devices, including:
a communication unit which sends and receives a state of the imaging device shooting the common subject to and from another imaging device;
a comparison unit which compares the states of the imaging devices, the states being sent and received;
a selection unit which selects a main device and a subordinate device for setting an imaging condition of the common subject based on the comparison;
a transmission unit which sends imaging information acquired or determined by the main device for shooting the common subject to the subordinate device when the imaging device functions as the main device; and
a setting unit which sets the imaging condition of the subordinate device based on the imaging information received from the main device and which images the common subject synchronously with the imaging unit when the imaging device functions as the subordinate device.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein:

FIG. 7 is a flow chart illustrating exemplary operations performed in a main-unit matching process in the imaging parameter setting process shown in FIG. 5;

FIG. 8 is a flow chart illustrating exemplary operations performed in a majority-voting process in the imaging parameter setting process shown in FIG. 5; and FIG. 9 is a flow chart illustrating exemplary operations performed in an averaging process in the imaging parameter setting process shown in FIG. 5,

DETAILED DESCRIPTION OF THE PREFERRED EMBODIMENT

Hereinafter, an embodiment of the present invention will be described with reference to the drawings. Though various technical limitations which are preferable to perform the present invention are included in the after-mentioned embodiment, the scope of the invention is not limited to the following embodiment and the illustrated examples.

Figure 1:
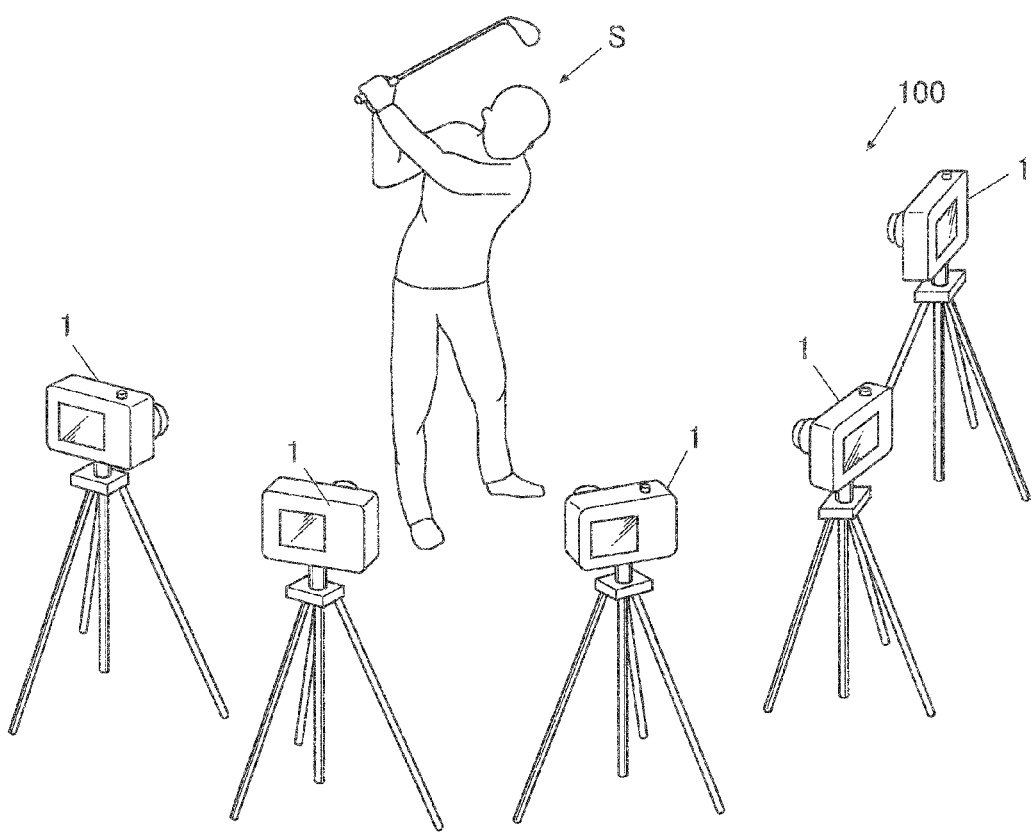
FIG. 1 is a schematic view of the configuration of an imaging control system according to an embodiment of the present invention.

FIG. 1 is a schematic view of the configuration of an imaging control system 100 according to an embodiment of the present invention.

As shown in FIG. 1, the imaging control system 100 according to the embodiment includes imaging devices 1 connected for mutual communication through, for example, wireless communication links. These imaging devices 1 perform a coordination process at the time of synchronous shooting of a common subject S. In the coordination process, the imaging control system 100 aligns imaging conditions, such as imaging parameters.

In FIG. 1, a subject S is surrounded by five imaging devices 1. This disposition is given for mere illustration and any number of imaging devices 1 may be placed at any positions.

In FIG. 1, the imaging devices 1 are fixed on, for example, tripods, but are not necessarily fixed at predetermined positions and may be held by hands at the time of shooting.

In the coordination process, for example, one of the imaging devices 1 functions as a main device and the other imaging devices 1 serves as subordinate devices. The main and subordinate devices are defined in the coordination process for coordinating imaging conditions performed at the time of shooting the subject S to determine individual imaging parameters. The main device and the subordinate devices in the coordination process may be different from the main device and the subordinate devices in an imaging process for imaging the subject S to control a synchronized imaging process.

All the imaging devices 1 have substantially the same configuration although they may operate differently, depending on the main or subordinate devices. All the imaging devices 1 are not necessarily of the same type.

The imaging devices 1 will now be described with reference to FIG. 2 and FIG. 3.

Figure 2:
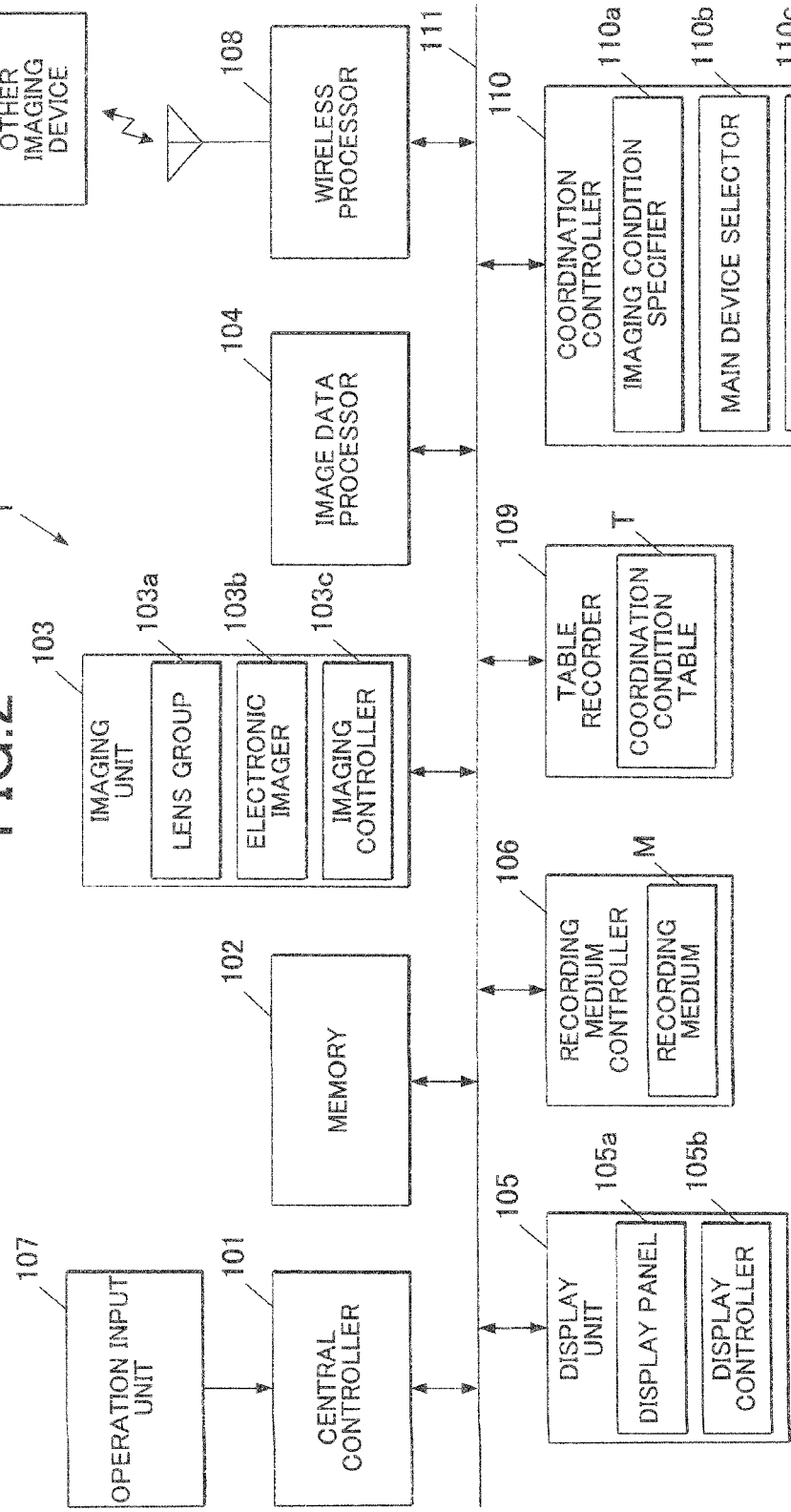
FIG. 2 is a schematic block diagram illustrating a configuration of an imaging device of the imaging control system shown in FIG. 1.

FIG. 2 is a schematic block diagram illustrating a configuration of an imaging device 1. FIG. 3 is a schematic view of an exemplary coordination condition table T in the imaging device 1.

As shown in FIG. 2, the imaging device 1 includes a central controller 101, a memory 102, an imaging unit 103, an image data processor 104, a display unit 105, a recording medium controller 106, an operation input unit 107, a wireless processor 108, a table recorder 109, and a coordination controller 110.

The central controller 101, the memory 102, the imaging unit 103, the image data processor 104, the display unit 105, the recording medium controller 106, the wireless processor 108, the table recorder 109, and the coordination controller 110 are connected via a bus 111.

The central controller 101 controls individual units of the imaging device 1. More specifically, the central controller 101 includes a central processing unit (CPU), a random access memory (RAM), and a read only memory (ROM) (not shown) to control the imaging device 1 in cooperation with various programs (not shown).

The memory 102 includes, for example, a dynamic random access memory (DRAM) to temporarily hold the data processed by the central controller 101 and other units of the imaging device 1.

The imaging unit 103 is an imaging means for imaging the subject S. More specifically, the imaging unit 103 includes a lens group 103a, an electronic imager 103b and an imaging controller 103c.

The lens group 103a includes lenses, such as a zoom lens and a focus lens.

The electronic imager 103b includes an image sensor, such as a charge coupled device (CCD) or a complementary metal-oxide semiconductor (CMOS), to convert an optical image formed through lenses in the lens group 103a into a two-dimensional image signal.

The imaging unit 103 may include a diaphragm (not shown) that adjusts the quantity of light passing through the lens group 103a.

The imaging controller 103c controls the imaging of the subject S. In other words, the imaging controller 103c includes a timing generator (not shown) and a driver (not shown). The imaging controller 103c drives the scanning of the electronic imager 103b with the timing generator and the driver. The imaging controller 103c directs the electronic imager 103b to convert an optical image formed by the lens group 103a at a predetermined cycle into a two-dimensional image signal, read a frame image for each screen from an image area of the electronic imager 103b, and directs the image data processor 104 to output the frame image.

The image data processor 104 sequentially processes the frame image captured by the imaging unit 103. More specifically, the image data processor 104 adjusts the gain of the analog signal of the frame image sent from the electronic imager 103b for each of RGB color components, sample-holds the gain-adjusted analog signal with a sample holding circuit (not shown), converts the sample-held analog signal into a digital signal with an A/D converter (not shown), performs color processing, such as pixel interpolation and gamma correction, on the digital signal with a color-process circuit (not shown), and then generates a digital luminance signal Y and color difference signals Cb, Cr (YUV data). The image data processor 104 then outputs the image data generated at a predetermined resolution to the memory 102.

To record an image, the image data processor 104 compresses the YUV data of the subject S in a predetermined encoding format, such as JPEG, Motion JPEG or MPEG, and then outputs the compressed data to the recording medium controller 106.

To reproduce an image, the image data processor 104 directs the recording medium controller 106 to read a still or moving image to be reproduced from the recording medium M, decodes the read image data in the corresponding predetermined encoding format, and output the decoded data to a display controller 105b. Alternatively, the image data processor 104 may contract the read image data to a predetermined size, such as a VGA or QVGA size, based on, for example, the resolution of a display panel 105a and then output the contracted data to the display controller 105b.

The display unit 105 includes the display panel 105a and the display controller 105b.

The display panel 105a displays an image in a display area. The display panel 105a is, for example, an LED display panel or an organic electro-luminescent display panel, but it should not be limited to them and any type of display panel may be used.

The display controller 105b controls the display of an image on the display panel 105a based on the image data of a predetermined size, the image data being read from the recording medium M and decoded by the image data processor 104. More specifically, the display controller 105b includes a video random access memory (VRAM), a VRAM controller, and a digital video encoder (not shown). The digital video encoder reads the luminance signal Y and the color difference signals Cb, Cr, which are decoded by the image data processor 104 and stored in the VRAM (not shown), at a predetermined reproduction frame rate, for example, 60 fps, from the VRAM via the VRAM controller, generates a video signal based on the data, and then outputs the generated video signal to the display panel 105a.

The recording medium controller 106 has a removable recording medium M and controls the reading or writing of data from/to a mounted recording medium M.

In other words, the recording medium controller 106 records the data of a moving image in a predetermined recording area of the recording medium M. The moving image includes frame images for recording which are encoded by an encoder (not shown) in the image data processor 104 in a predetermined compression format, such as Motion JPEG or MPEG.

The recording medium M includes, for example, a non-volatile memory (flash memory).

The operation input unit 107 allows a user to perform a predetermined operation on the imaging device 1. More specifically, the operation input unit 107 includes an operating section having, for example, a power button to power on or off the device, a shutter button to shoot the subject S, a selection button to select an imaging mode or function, and a zoom button to adjust the amount of zoom (all of them are not shown). In response to a user operation of a button in the operating section, the operation input unit 107 outputs a predetermined operation signal to the central controller 101.

The wireless processor 108 performs wireless communications with the wireless processor 108 of other imaging devices 1.

In other words, the wireless processor 108 is a communicating means for communication via predetermined communication links. More specifically, the wireless processor 108 operates in the peer-to-peer (ad hoc) mode. In the peer-to-peer mode, the wireless processor 108 establishes a wireless communication link directly with the wireless processor 108 of other imaging device 1 not via, for example, an external access point (fixed station). The wireless processor 108 includes, for example, a wireless LAN module. The wireless processor 108 sends and receives signals to and from the wireless processor 108 of other imaging device 1 within a wireless communication range through a predetermined wireless communication link, such as a wireless local area network (LAN).

Alternatively, the wireless processor 108 may operate in, for example, the infrastructure mode. In the infrastructure mode, the wireless processor 108 may establish a predetermined wireless communication link with an access point within a wireless communication range to send and receive signals to and from the wireless processor 108 of other imaging device 1 through the wireless communication link.

The wireless processor 108 may be, for example, incorporated in the recording medium M or connected to the body of the imaging device with a predetermined interface, such as universal serial bus (USB).

The wireless communication link should not be limited to wireless LAN and may be of any type of network, such as, wide area network (WAN).

Figure 3:
FIG. 3 is a schematic view of an exemplary coordination condition table in the imaging device shown in FIG. 2.

The table recorder 109 has a coordination condition table T (See FIG. 3).

The coordination condition table T is used in a coordination process for coordinating the imaging conditions of the imaging devices 1. More specifically, as shown in FIG. 3, the coordination condition table T contains coordination conditions and methods for setting these conditions in association with each imaging situation (imaging scene) of the subject S.

The imaging situations of the subject S include a situation in which imaging devices 1 shoot a common subject S, such as sports, children, or landscape, synchronously under imaging conditions coordinated in the coordination process. The imaging situations of the subject S may be default values stored on the table, such as imaging situation 1 or imaging situation 2, or an imaging situation arbitrarily set by a user through a predetermined operation of the operation input unit 107 and the like.

The coordination conditions refer to imaging conditions coordinated among the imaging devices 1 shooting the common subject S in the coordination process. More specifically, the coordination conditions include, for example, the imaging format of the common subject S (such as a still or moving image), the number of coordinated imaging devices 1, imaging parameters (such as white balance, exposure time, aperture, ISO speed, image size, focal position and face detection), and coordination details of the imaging parameters (such as coordination or non-coordination, automatic or manual setting, setting mode, and selection mode of the main device).

For a user specified imaging situation, coordination conditions can be arbitrarily specified by a user. Such a coordination condition is indicated with "?" in the coordination condition table T, as shown in FIG. 3.

The methods for setting an imaging parameter include, for example, the adopting and setting of the value of the imaging parameter of a main imaging device 1 and a value measured at the time of setting the imaging parameter, adopting and setting of an average of values tentatively adopted by the imaging devices 1, adopting and setting of a value selected by majority vote from values tentatively adopted by the imaging devices 1, and individual and independent setting by each imaging device 1.

In other words, an imaging parameter is, for example, set manually by a user who operates any one of the imaging devices 1 through a predetermined operation or set automatically based on the information indicating the state of the common subject S (described in detail later). In the case of manual setting of an imaging parameter, such as ISO speed or image size, any one of the imaging devices 1 that has been operated by a user is selected as a main device by a main device selector 110b (described later). The value of the imaging parameter (imaging condition) of the main device is also adopted for all the other imaging devices 1 and automatically set in these imaging devices 1. In the case of the automatic set of an imaging parameter, such as white balance, the value of the imaging parameter (imaging condition) of an imaging device 1 automatically selected as a main device from the imaging devices 1 by the main device selector 110b (described later) or a value measured at the time of setting the imaging parameter (for example, the color of the subject S in the case of white balance) is also adopted for all the other imaging devices 1 and is automatically set in these imaging devices 1.

The coordination or non-coordination of an imaging parameter indicates participation or non-participation in the coordination process for coordinating the imaging conditions of the imaging devices 1, that is, the coordination or non-coordination of an imaging parameter among the imaging devices 1 synchronously shooting a common subject S. In other words, the coordination condition table T (a recording means) contains criteria on coordination or non-coordination among the imaging devices 1 synchronously shooting a common subject S for each imaging condition (imaging parameter).

The coordination or non-coordination of an imaging parameter (participation or non-participation in the coordination process) is specified in the coordination condition table T for each of the imaging situations of the subject S, more specifically, for each of imaging parameters in the imaging situation. In other words, the coordination condition table T contains coordination conditions for participation or non-participation of the imaging devices 1 in the coordination process for each of imaging situations.

The exposure time, aperture and ISO speed are imaging parameters relevant to the adjustment of exposure at the time of shooting the common subject S. As described above, the coordination or non-coordination of the imaging parameters of exposure time, aperture and ISO speed is specified in the coordination condition table T for each of the imaging situations of the subject S. In other words, the coordination condition table T contains coordination conditions for the exposure adjustment at the time of shooting the common subject S by the imaging devices 1 for each of imaging situations.

Face detection refers to the detection of the face of the subject S from the image of the common subject S (for example, a live view image). As described above, the coordination or non-coordination of the imaging parameter of face detection is specified in the coordination condition table T for each of the imaging situations of the subject S. In other words, the coordination condition table T contains a coordination condition for the face detection at the time of shooting the common subject S by the imaging devices 1 for each of imaging situations.

The detailed description of the face detection is omitted because it is known art.

The number of coordinated imaging devices 1 indicates the number of imaging devices 1 participating in the coordination process for coordinating the imaging conditions of the imaging devices 1.

The number of coordinated imaging devices 1 is specified in the coordination condition table T for each of the imaging situations of the subject S. In other words, the coordination condition table T contains a coordination condition for the number of imaging devices 1 coordinated in the coordination process for each of imaging situations.

The method for selecting a main device is a criterion for selecting an imaging device 1 that functions as a main device in the process for coordinating the imaging conditions of the imaging devices 1 that synchronously shoot the common subject S thereamong. In other words, the coordination condition table T (recording means) contains a criterion for selecting a main imaging device 1 in the process for coordinating the imaging conditions of the imaging devices 1 among the imaging devices 1 that synchronously shoot the common subject S for each of imaging conditions (imaging parameters).

The coordination condition table T contains a method for evaluating the state of an imaging device 1 shooting the common subject S as a criterion for selecting a main imaging device 1 for each of imaging conditions. In other words, it is preferable to select an imaging device 1 having the state most suitable for setting an imaging condition coordinated among the imaging devices 1 as a main device. For example, an imaging device 1 shooting the common subject S in its best state may be selected as a main device from the imaging devices 1. More specifically, the main device is selected from the imaging devices 1 as follows: An imaging device 1 shooting the common subject S at a position closer to the center of the composition of the imaging device 1 is selected as a main device; an imaging device 1 shooting the common subject S at a shorter distance is selected as a main device; an imaging device 1 shooting the common subject S with the largest area in the composition of each imaging device 1 is selected as a main device; or an imaging device 1 having the operation input unit 107 that has been operated by a user in a predetermined manner is selected as a main device.

Such a main device selecting method is specified in the coordination condition table T for each of the imaging situations of the subject S, more specifically, for each imaging parameter in each imaging situation. In other words, since the imaging devices 1 other than the one selected as a main device from the imaging devices 1 function as subordinate imaging devices, the coordination condition table T contains a coordination condition for selecting a main device and subordinate devices from the imaging devices 1 in the coordination process for each of imaging situations.

The content of the coordination condition table T shown in FIG. 3 is given for mere illustration and may be varied as appropriate.

For example, the coordination condition table T contains a coordination condition for the position of an imaging device 1 (such as front, side, or rear) for each of imaging situations. The position is coordinated in the coordination process for coordinating the imaging conditions of the imaging devices 1. For example, in an imaging situation of sport, such as golf, front, back or rear of a flying ball may be specified as the position of an imaging device 1 to facilitate the checking or analysis of the form of a person who swings a golf club.

The coordination controller 110 includes an imaging situation specifier 110a, a main device selector 110b, a relevant information acquiring unit 110c, and an imaging condition determining unit 110d.

Each unit of the coordination controller 110 includes, for example, a predetermined logic circuit, but should not be limited to this configuration and any other configuration may be used.

The imaging situation specifier 110a (an identifying means) identifies the situation in which the imaging devices 1 shoot the common subject S.

Assume that an imaging device 1 is subject to a predetermined operation of the operation input unit 107 by a user and then selected as a main device from the imaging devices 1 by the main device selector 110b (described later). On the display unit 105 of the imaging device 1, indexes (for example, icons) corresponding to imaging situations are displayed. The imaging situation specifier 110a of the imaging device 1 identifies an imaging situation corresponding to the index specified through a predetermined operation of the operation input unit 107 by the user as the imaging situation of the common subject S.

Alternatively, the imaging situation specifier 110a of the main imaging device 1 may, for example, perform predetermined subject detection (for example, face or edge detection) based on, for example, the image data of the live view image generated by the image data processor 104 to identify the type of common subject S (for example, man or landscape) and then identify the imaging situation of the common subject S.

The method for identifying the imaging situation of the common subject S should not be limited to this method and may be modified as appropriate.

The main device selector 110b automatically selects a main device from the imaging devices 1 in the coordination process.

In other words, the main device selector 110b (a selecting means) selects an imaging device 1 that functions as a main device in the coordination process for coordinating the imaging conditions of the imaging devices 1 from the imaging devices 1 that synchronously shoot the common subject S based on the state of each imaging device 1, the state concerning imaging the common subject S. More specifically, the main device selector 110b selects an imaging device 1 that is shooting the common subject S in the best state as a main device from the imaging devices 1. In other words, to automatically set an imaging condition (for example, white balance or exposure condition) at the time of shooting the common subject S, the state of the subject S (for example, color or brightness) should be measured. The main device selector 110b selects an imaging device 1 under the best state on parameters, such as the imaging size of the subject S or a distance to the subject S, among the imaging devices 1. The main device selector 110b selects, for example, an imaging device 1 that captures the subject S with a larger size than any other device does or that is disposed at a shorter distance to the subject S, as a main device.

For example, the main device selector 110b selects a main imaging device 1 from the imaging devices 1 based on criteria for selecting a main imaging device 1. The selection criteria are associated with each imaging parameter (imaging condition) in the coordination condition table T. The main device selector 110b selects an imaging device 1 having the highest score in the evaluation of the state of the imaging devices 1 shooting the common subject S (selection mode of the main device) as a main device. These imaging conditions for evaluation of the state of the imaging devices 1 are specified in the coordination condition table T.

The main device selector 110b sequentially performs a process for selecting a main imaging device 1 from the imaging devices 1 at a predetermined time interval.

In the case of selecting a main device that coordinates the white balance in the imaging situation 1 in the coordination condition table T, the main device selector 110b performs predetermined subject detection (for example, face or edge detection) based on the image data of a live view image generated by the image data processor 104 to identify the position of the common subject S in the composition of the live view image. The main device selector 110b acquires a live view image through wireless communications of the wireless processor 108 with other imaging devices 1 and then identifies the position of the common subject S in the composition of the live view image based on the image data thereof in a similar process. The main device selector 110b then evaluates the distance from the center of the composition to the common subject S for each of the imaging devices 1 and then selects an imaging device 1 shooting the common subject S at a position closer to the center in its composition as a main device from the imaging devices 1.

In the case of selecting a main device that coordinates the white balance in the imaging situation 2 in the coordination condition table T, the main device selector 110b acquires information on the position, on the optical axis, of a focus lens from a focusing controller (not shown) of the imaging controller 103c while the common subject S is being focused and then calculates a distance to the subject S based on the position information by a predetermined converting means (for example, a conversion program or table). The main device selector 110b acquires a distance between another imaging device 1 and the subject S through wireless communications of the wireless processor 108 with the other imaging device 1. The main device selector 110b evaluates the distance to the subject S for each of the imaging devices 1 and selects an imaging device 1 shooting the common subject S at the closest position (or from the shortest distance) as a main device from the imaging devices 1.

Likewise, in the case of selecting a main device that coordinates the white balance in the imaging situation 2 in the coordination condition table T, the main device selector 110b performs predetermined subject detection (for example, face or edge detection) based on the image data of a live view image generated by the image data processor 104 to determine the area of the common subject S (the number of pixels) in the composition of the live view image. The main device selector 110b acquires a live view image through wireless communications of the wireless processor 108 with another imaging device 1 and then determines the area of the common subject S in the composition of the live view image based on the image data of the live view image in a similar process. The main device selector 110b evaluates the area of the subject S for each of the imaging devices 1 and then selects an imaging device 1 shooting the common subject S with the largest area in the composition as a main device from imaging devices 1. In other words, the main device selector 110b can select an imaging device 1 shooting the common subject S from the front with the largest area as a main device from the imaging devices 1.

Alternatively, the main device selector 110b selects an imaging device 1 having the operation input unit 107 that has been subject to a predetermined operation by a user as a main device.

For example, in the case of selecting a main device that coordinates an ISO speed or an image size in the imaging situation 1 in the coordination condition table T, the main device selector 110b of the imaging device 1 that has been subject to the predetermined operation by the user selects itself as a main device from the imaging devices 1.

All the imaging devices 1 other than an imaging device 1 selected as a main device by its main device selector 110b function as subordinate imaging devices. The main device selector 110b of an imaging device 1 acquires the states of the imaging devices 1 shooting the common subject S and determines the role of each imaging device, that is, a main or subordinate device based on the acquired state of the imaging device 1. In other words, the main device selector 110b, which is a determining means, determines a main device and subordinate devices from the imaging devices 1 based on the coordination conditions specified in the coordination condition table T in association with the imaging situation, identified by the imaging situation specifier 110a, of the common subject S.

The criteria for selecting a main imaging device 1 in association with the above mentioned imaging conditions maybe modified as appropriate without limitation.

Detailed description of the detection of the subject S from a live view image is omitted because it is known art.

The relevant information acquiring unit 110c acquires shooting information (main device-related information) relevant to a main imaging device 1.

In other words, the relevant information acquiring unit (a first acquiring means) 110c acquires the shooting information (main device-related information) acquired at the time of shooting of the common subject S by an imaging device 1 selected as a main device by the main device selector 110*b* or evaluated at the time of setting an imaging condition of the main imaging device 1.

For the setting mode of "Adopt setting (measurement) of main device", the relevant information acquiring unit 110*c* acquires the information indicating the state of the common subject S (for example, the color and/or brightness of the subject S) which has been acquired (measured) at the time of shooting of the common subject S by the main imaging device 1 as shooting information (main device-related information). More specifically, the relevant information acquiring unit 110*c* of an imaging device 1 selected as a main device by the main device selector 110*b* from the imaging devices 1 acquires the information indicating the state of the common subject S which is acquired (measured) at the time of shooting the common subject S by the main imaging device 1. In contrast, the relevant information acquiring unit 110*c* of an imaging device 1 which has been selected as a subordinate device by the main device selector 110*b* acquires the shooting information (main device-related information) indicating the state of the common subject S sent from the main imaging device 1 through a predetermined wireless communication link of the wireless processor 108.

For the setting mode of "Adopt average", "Determined by majority voting" or the like, the relevant information acquiring unit (a second acquiring means) 110*c* further acquires the information indicating the state of the common subject S (for example, the color or brightness of the subject S) acquired (measured) at the time of shooting of the common subject S by a subordinate imaging device 1. More specifically, the relevant information acquiring unit 110*c* acquires the information indicating the state of the common subject S through a wireless communication link of the wireless processor 108 for the other imaging devices 1. Alternatively, the relevant information acquiring unit 110*c* may acquire tentative parameters (for example, white balance, exposure time, and aperture) as the information indicating the state of the common subject S, in place of measurements (for example, the color, and brightness of the subject S) acquired at the time of shooting of the common subject S.

The shooting information (main device-related information) determined at the time of setting an imaging condition of an imaging device 1 selected as a main device by the main device selector 110*b* includes the setting of imaging parameters (for example, ISO speed and image size) manually set through a predetermined operation of the operation input unit 107 by a user.

The relevant information acquiring unit 110*c* sequentially acquires the shooting information (main device-related information) of an imaging device 1 sequentially selected as a main device by the main device selector 110*b*. In other words, each time the main device selector 110*b* selects an imaging device 1 as a main device, the relevant information acquiring unit 110*c* sequentially acquires the shooting information (main device-related information) of the main device.

The imaging condition determining unit 110*d* determines the value of an imaging condition applicable to the imaging devices 1.

In other words, the imaging condition determining unit (a determining means) 110*d* determines the value of an imaging condition applicable to the imaging devices 1 based on the shooting information (main device-related information) acquired by the relevant information acquiring unit 110*c*. More specifically, the imaging condition determining unit 110*d* determines the value of an imaging condition applicable to the imaging devices 1 (for example, the setting of white balance or exposure) based on the information indicating the state of the common subject S (for example, the measurement of color or brightness of the subject S) acquired by the relevant information acquiring unit 110*c*. In other words, the imaging condition determining unit 110*d* selects any one of the imaging conditions (for example, white balance) from the imaging conditions and then determines the value of the imaging condition (for example, the setting of the white balance) based on, for example, the information indicating the state of the common subject S (for example, the measurement of color of the subject S) acquired by the relevant information acquiring unit 110*c*. The imaging condition determining unit 110*d* then directs all the other imaging devices 1 to adopt the determined value of the imaging condition. More specifically, the imaging condition determining unit 110*d* directs the wireless processor 108 to send the determined value of the imaging condition and a control signal to set the value to all the other imaging devices 1.

In other words, the imaging condition determining unit 110*d* makes an imaging device 1 selected as a main device by the main device selector 110*b* determine the value of an imaging condition applicable to all the other imaging devices 1.

Alternatively, the imaging condition determining unit 110*d* may send the determined value of the imaging condition and a control signal to independently set the determined value to each of all the other imaging devices 1 via the wireless processor 108. All the other imaging devices 1 independently set a value of the imaging condition based on the determined value of the imaging condition. In other words, the other imaging devices 1 do not adopt the values, determined by the imaging condition determining unit 110*d* of the main imaging device 1, on the imaging condition (for example, the setting of white balance) as they are. All the other imaging devices 1 can independently set a value on the imaging condition based on the value on the imaging condition determined by the main device.

In other words, the imaging condition determining unit 110*d* selects any one of the imaging conditions (for example, white balance) from the imaging conditions, determines the value on the imaging condition and then prompts all the other imaging devices 1 to set a value on the imaging condition independently based on the determined value on the imaging condition.

The imaging condition determining unit (a second determining means) 110*d* determines the value of an imaging condition applicable to the individual imaging devices 1 based on the information indicating the state of the common subject S, acquired by the relevant information acquiring unit 110*c*, of the main imaging device 1 and of the subordinate imaging devices 1. More specifically, the imaging condition determining unit 110*d* determines the values of the imaging conditions of the imaging devices 1 based on the information (for example, the information indicating the state of the common subject S, such as exposure time and aperture), used at the time of setting the imaging conditions and acquired through wireless communication links of the wireless processor 108, of all the imaging devices 1, including the main device and the subordinate devices, and also based on the criteria for setting the imaging conditions in the coordination condition table T.

For example, the imaging condition determining unit 110*d* acquires a value measured at the time of shooting the common subject S by each of all the imaging devices 1, including the main device and the subordinate devices, or a representative value of the settings tentatively determined (for example, an average or a setting determined by majority vote) to determine the value of an imaging condition applicable to the imaging devices 1. More specifically, for example, in the case of coordinating the exposure time or aperture in the imaging situation 1 in the coordination condition table T, the imaging condition determining unit 110*d* acquires the settings tentatively determined at the time of shooting the common subject S by each of all the imaging devices 1, including the main device and the subordinate devices, through wireless communication links of the wireless processor 108 to calculate a representative value (for example, an average for exposure time and a setting determined by majority vote for aperture). The imaging condition determining unit 110*d* adopts the calculated representative value as the value of the imaging condition applicable to the imaging devices 1.

For an imaging condition not coordinated among the imaging devices 1 in the coordination condition table T (for example, focal position), the imaging condition determining unit 110*d* sends a control signal to all the other imaging devices 1 that directs these devices to set the value of the imaging condition independently. Since the imaging devices 1 has different focal positions depending on the distance to the subject S or the relative angle to the subject S, all the other imaging devices 1 can set the value of the imaging condition independently without consideration of the value, determined by the imaging condition determining unit 110*d* of the main imaging device 1, on the imaging condition.

The imaging condition determining unit 110*d* of each imaging device 1, which is a determining means, determines the value on a coordination condition based on the coordination condition or a method for determining the coordination condition specified in the coordination condition table T in association with the imaging situation of the common subject S determined by the imaging situation specifier 110*a*. More specifically, the imaging condition determining unit 110*d* determines at least one of the number of imaging device 1 coordinated in the coordination process, participation or non-participation of each of the imaging devices 1 in the coordination process, and the positions of the imaging devices 1 coordinated in the coordination process based on the imaging situation, identified by the imaging situation specifier 110*a*, of the common subject S.

In the case of the imaging situation 1 being identified by the imaging situation specifier 110*a*, the imaging condition determining unit 110*d* determines the number of imaging devices 1 associated with the imaging situation 1 to be 4, with reference to the coordination condition table T. In the case of the imaging situation 1 being identified by the imaging situation specifier 110*a*, the imaging condition determining unit 110*d* determines the coordination or non-coordination of (participation or non-participation in the coordination process) of an imaging parameter, such as white balance, with reference to the coordination condition table T.

The imaging condition determining unit 110*d* of each imaging device 1, which is a determining means, determines to associate the face detection with the imaging devices 1 based on a coordination condition specified in the coordination condition table T in association with the imaging situation, identified by the imaging situation specifier 110*a*, of the common subject S.

In the case of the imaging situation 1 being identified by the imaging situation specifier 110*a*, "YES" is specified for the coordination of the imaging parameter of face detection in the coordination condition table T. The imaging condition determining unit 110*d* determines the face detection process such that the performance or non-performance of the face detection is coordinated among the imaging devices 1 with reference to the coordination condition table T.

The imaging condition determining unit 110*d* of each imaging device 1, which is a determining means, determines to coordinate exposure adjustment among the imaging devices 1 based on the coordination condition specified in the coordination condition table T in association with the imaging situation, identified by the imaging situation specifier 110*a*, of the common subject S.

In the case of the imaging situation 1 being identified by the imaging situation specifier 110*a*, "YES" is specified for the coordination of the exposure adjustment-related imaging parameters of exposure time and aperture in the coordination condition table T. The imaging condition determining unit 110*d* determines the exposure adjustment process such that the settings of the exposure time and the aperture are coordinated among the imaging devices 1, with reference to the coordination condition table T.

The imaging condition determining unit 110*d* sequentially determines the value of an imaging condition applicable to the imaging devices 1 based on the shooting information (main device-related information) sequentially acquired by the relevant information acquiring unit 110*c*. In other words, each time the relevant information acquiring unit 110*c* acquires shooting information (main device-related information), the imaging condition determining unit 110*d* sequentially determines the value of an imaging condition applicable to the imaging devices 1 based on the acquired shooting information (main device-related information).

Synchronous Imaging Process

A synchronous imaging process will now be described with reference to FIG. 4 to FIG. 9.

Figure 4:
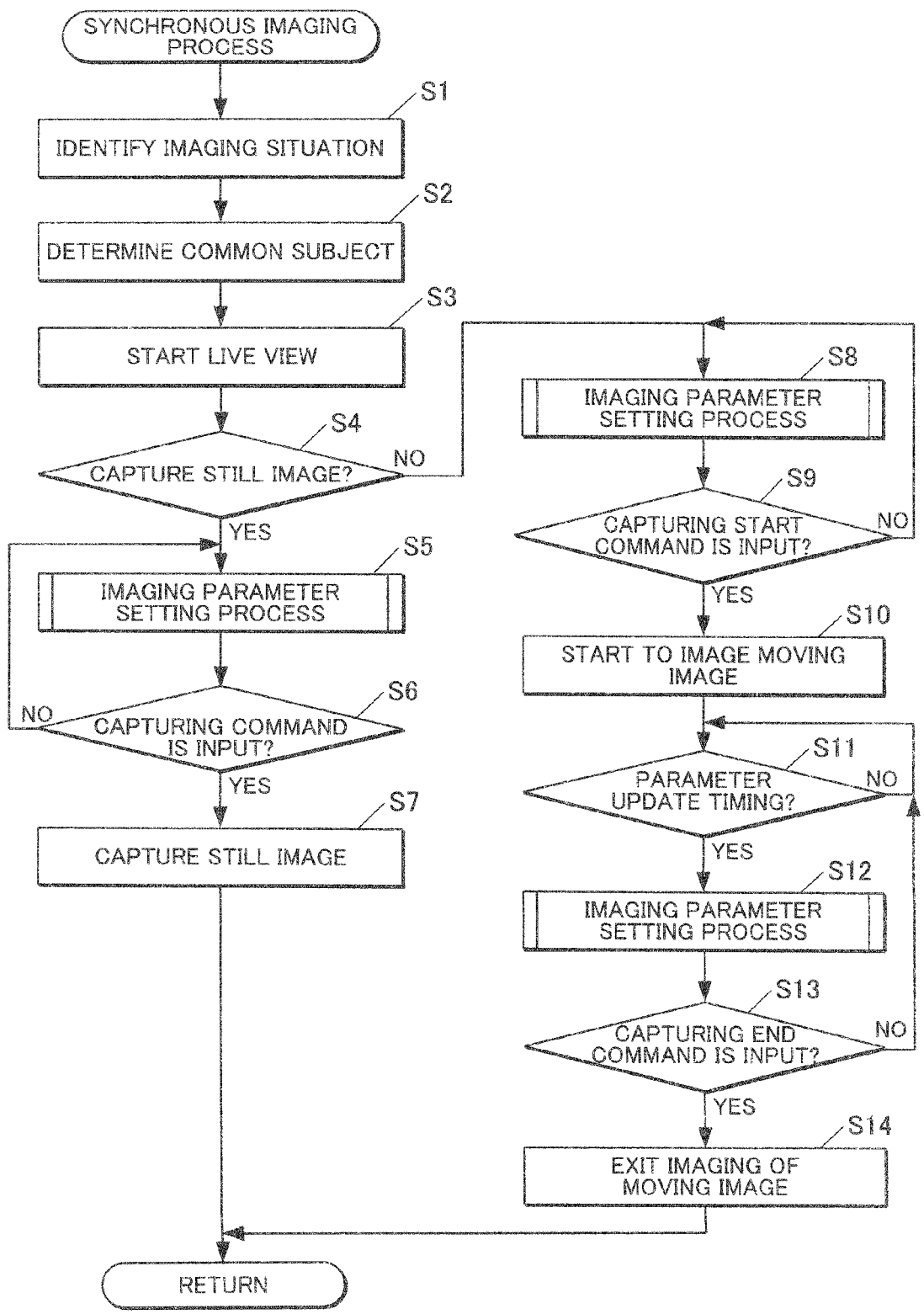
FIG. 4 is a flow chart illustrating exemplary operations performed in a synchronous imaging process in the imaging control system shown in FIG. 1.

FIG. 4 is a flow chart illustrating exemplary operations performed in the synchronous imaging process of the imaging control system 100.

The synchronous imaging process described below is performed in each imaging device 1, regardless the role of each imaging device constituting the imaging control system 100, that is, a main or subordinate device 1 in the coordination process. The imaging devices 1 are preliminarily connected with each other for mutual communications through wireless communication links.

As shown in FIG. 4, when a user selects one of the indexes (for example, icons) corresponding to imaging situations displayed on the display unit 105 of any one of the imaging devices 1 through a predetermined operation of the operation input unit 107, the imaging situation specifier 110*a* identifies an imaging situation corresponding to the specified index (for example, the imaging situation 1) as the imaging situation of the common subject S (Step S1). The imaging device 1 then determines the type of common subject S corresponding to the identified imaging situation (Step S2).

If, for example, a sport situation is identified as an imaging situation, a person performing the sport is determined as a common subject S. More specifically, a predetermined subject detection process (for example, face or edge detection) may be performed to detect a subject S and then determine the type of common subject S (for example, a person or landscape).

An imaging device 1 that has been operated to specify an imaging situation functions as a main device among the imaging devices 1. The main imaging device 1 sends the information concerning the identified imaging situation and the type of common subject S to all the other imaging devices 1 through wireless communication links.

The imaging unit 103 of the main imaging device 1 starts to capture the live view image of the subject S (live view) and sends a control signal to start a live view to all the other imaging devices 1 through wireless communication links (Step S3). In response to the control signal, all the subordinate imaging devices 1 start live view.

The coordination controller 110 of each imaging device 1 determines whether a still image is to be captured based on the imaging format associated with the identified imaging situation, with reference to the coordination condition table T (Step S4).

If the capturing of a still image is determined at Step S4 (Step 84: YES), the coordination controller 110 performs an imaging parameter setting process (see FIG. 5) (Step S5: described in detail later). The CPU of the central controller 101 of each imaging device 1 determines whether a capturing command has been entered (Step S6). For example, when a user operates the operation input unit 107 of any one of the imaging devices 1, the CPU of the central controller 101 of the imaging device 1 determines the input of a capturing command. The imaging device 1 functions as a main device to send a capturing command to all the other imaging devices 1 through wireless communication links. In response to the capturing command, all the imaging devices 1 other than the main device determine that a capturing command has been entered.

If a capturing command is determined to have been entered at Step S6 (Step S6: YES), the CPU of the central controller 101 of each imaging device 1 directs the imaging unit 103 to capture a still image of the common subject S and directs the image data processor 104 to transfer the generated image data to the recording medium controller 106 for recording in the recording medium 106a (Step S7).

If no capturing command is determined to have been entered (Step S6: NO), the CPU of the central controller 101 of each imaging device 1 returns the control to Step S5. The coordination controller 110 performs the imaging parameter setting process again (Step S5).

Alternatively, if no capturing command is determined to have been entered (Step S6: NO), the CPU of the central controller 101 may repeatedly check the entry of a capturing command at a predetermined time interval without performing the imaging parameter setting process again.

If no still image is determined to be captured at Step S4 (Step S4: NO), it indicates that a moving image is to be captured. The coordination controller 110 of each imaging device 1 performs the imaging parameter setting process (see FIG. 5) (Step S8: described in detail later). The CPU of the central controller 101 of each imaging device 1 determines whether a capturing start command has been entered (Step S9). If, for example, the operation input unit 107 of any one of the imaging devices 1 has been subject to a predetermined operation by the user, the CPU of the central controller 101 of the imaging device 1 determines that a capturing start command has been entered. The imaging device 1 functions as a main device to send the capturing start command to all the other imaging devices 1 through wireless communication links. In response to the capturing start command, all the imaging devices 1 other than the main device determine that a capturing start command has been entered.

If the capturing start command is determined to have been entered at Step S9 (Step S9: YES), the CPU of the central controller 101 of each imaging device 1 directs the imaging unit 103 to start capturing a moving image of the common subject S (Step S10).

If no capturing start command is determined to have been entered (Step S9: NO), the CPU of the central controller 101 of each imaging device 1 returns the control to Step S8. The coordination controller 110 performs the imaging parameter setting process (Step S8).

Alternatively, if no capturing start command is determined to have been entered (Step S9: NO), the CPU of the central controller 101 may repeatedly check the entry of a capturing start command at a predetermined time interval.

The coordination controller 110 of each imaging device 1 determines whether it is time to update imaging parameter(s) (Step S11). If it is determined not to be time to update (Step S11: NO), the coordination controller 110 repeatedly check the timing to update the imaging parameter at a predetermined time interval.

If it is determined to be time to update imaging parameter(s) (Step S11: YES), the coordination controller 110 of each imaging device 1 performs the imaging parameter setting process again (Step S12).

The update of imaging parameter(s) may be performed for all or part of the imaging parameters on the coordination condition table T. More specifically, update or non-update may be preset for each imaging parameter on the coordination condition table T so that the coordination controller 110 can determine update or non-update for each imaging parameter. This can avoid updating a preliminarily determined imaging parameter, such as an image size, which does not need updating during the imaging of a moving image.

Subsequently, the CPU of the central controller 101 of each imaging device 1 determines whether a capturing stop command has been entered (Step S13). If the operation input unit 107 of any one of the imaging devices 1 (for example, the main device that has issued a capturing start command) has been subject to a predetermined operation by the user, the CPU of the central controller 101 of the imaging device 1 determines that the capturing stop command has been entered. The imaging device 1 functions as a main device and sends the capturing stop command to all the other imaging devices 1 through wireless communication links. In response to the capturing stop command, all the imaging devices 1 other than the main device determine that the capturing stop command has been entered.

If the capturing stop command is determined to have been entered at Step S13 (Step S13: YES), the CPU of the central controller 101 of each imaging device 1 directs the imaging unit 103 to stop capturing the moving image of the common subject S and directs the image data processor 104 to transfer the generated image data to the recording medium controller 106 for recording in the recording medium 106a (Step S14).

If no capturing stop command is determined to have been entered (Step S13: NO), the CPU of the central controller 101 of each imaging device 1 returns the control to Step S11. The coordination controller 110 determines whether it is time to update imaging parameter(s) (Step S11).

Imaging Parameter Setting Process

An imaging parameter setting process in the synchronous imaging process will now be described with reference to FIG. 5 to FIG. 9.

Figure 5:
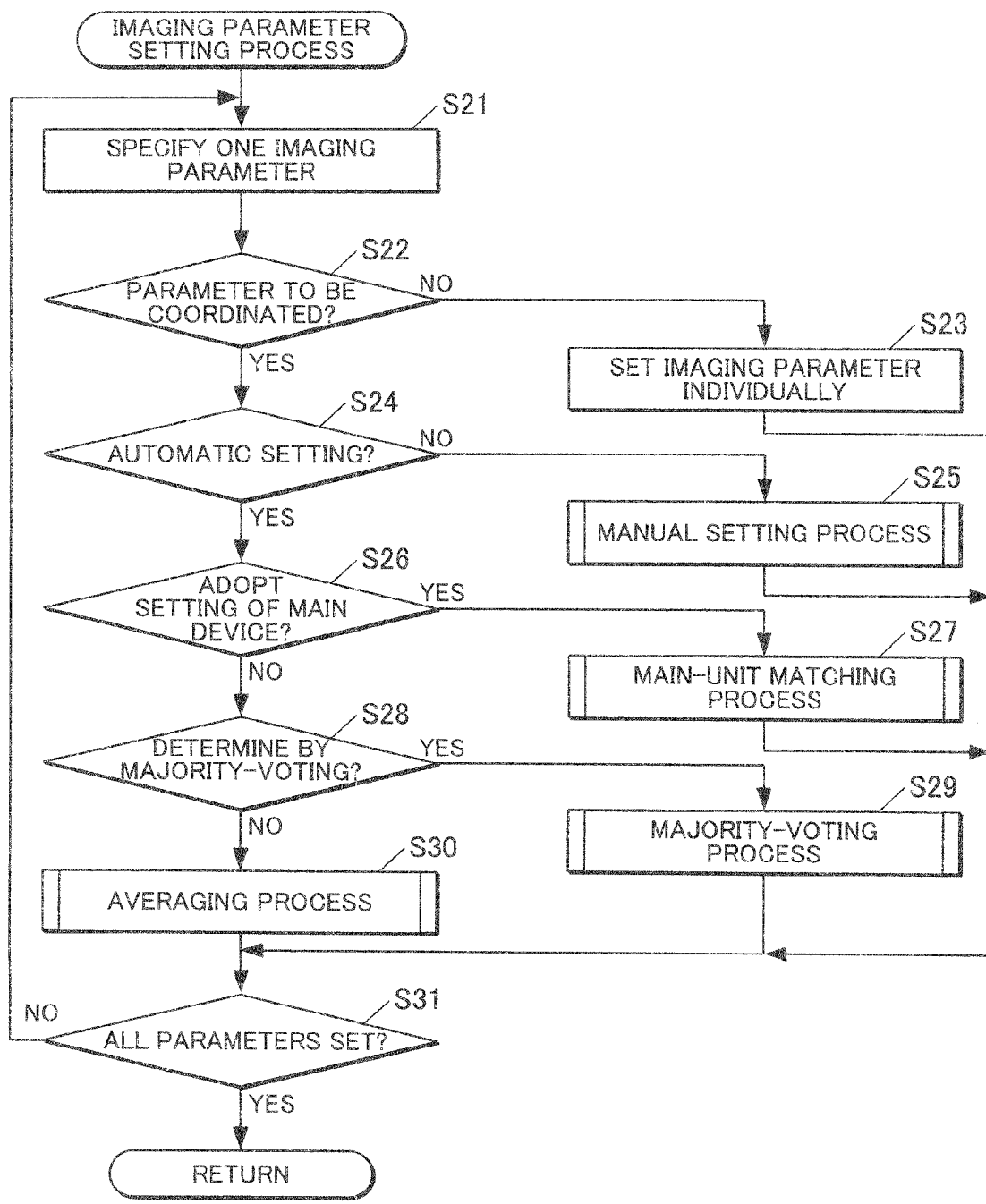
FIG. 5 is a flow chart illustrating exemplary operations performed in an imaging parameter setting process in the synchronous imaging process shown in FIG. 4.

FIG. 5 is a flowchart illustrating exemplary operations performed in the imaging parameter setting process.

As shown in FIG. 5, the coordination controller 110 of each imaging device 1 selects one of the imaging parameters associated with the imaging situation identified in Step S1, with reference to the coordination condition table T (Step S21).

The coordination controller 110 determines whether the selected imaging parameter is to be coordinated among the imaging devices 1, with reference to the coordination condition table T (Step S22).

If the selected imaging parameter is determined not to be coordinated at Step S22 (Step S22: NO), the parameter is individually set by each imaging device 1 (for example, the focal position in the imaging situation 1). The coordination controller 110 of each imaging device 1 then sets the value of the imaging parameter individually (Step S23).

If the selected imaging parameter is determined to be coordinated (Step S22: YES), the coordination controller 110 of each imaging device 1 determines whether the imaging parameter is to be set automatically, with reference to the coordination condition table T (Step S24).

If the imaging parameter is determined not to be automatically set at Step S24 (Step 924: NO), it indicates that the imaging parameter is manually set through a user operation (for example, the ISO speed in the imaging situation 1). The coordination controller 110 of each imaging device 1 then performs a manual setting process (see FIG. 6) (Step S25: described in detail later).

If the imaging parameter is determined to be set automatically (Step S24: YES), the coordination controller 110 of each imaging device 1 determines whether a main device setting is adopted for the imaging parameter at the time of setting the value of the imaging parameter, with reference to the coordination condition table T (Step S26).

If a main device setting is determined to be adopted for the imaging parameter (for example, the white balance in the imaging situation 1) at Step S26 (Step S26: YES), the coordination controller 110 of each imaging device 1 performs a main-unit matching process (See FIG. 7) (Step S27: described in detail later).

If no main device setting is determined to be adopted for the imaging parameter (Step S26: NO), the coordination controller 110 of each imaging device 1 determines whether the value of the imaging parameter is to be determined by majority vote of the imaging devices 1, with reference to the coordination condition table T (Step S28).

If the imaging parameter is determined to be selected by majority vote (for example, the aperture in the imaging situation 1) at Step S28 (Step S28: YES), the coordination controller 110 of each imaging device 1 performs a majority-voting process (see FIG. 8) (Step S29: described in detail later).

If the imaging parameter is determined not to be selected by majority vote (Step S28: NO), it indicates that the value of the imaging parameters is to be determined by obtaining an average of the imaging devices 1 (for example, the exposure time in the imaging situation 1). The coordination controller 110 of each imaging device 1 then performs the averaging process (see FIG. 9) (Step 830: described in detail later).

Subsequently, the coordination controller 110 of each imaging device 1 determines whether the values of all the imaging parameters associated with the imaging situation identified in Step S1 have been set, with reference to the coordination condition table T (Step S31).

If some values are determined not to have been set (Step S31: NO), the coordination controller 110 of each imaging device 1 returns the control to Step S21 to identify an imaging parameter whose value has not been set from imaging parameters (Step S21).

The steps from S22 to S30 are repeated until the values of all the imaging parameters are determined to have been set at Step S31 (Step S31: YES).

If the values of all the imaging parameters are determined to have been set at Step S31 (Step S31), the coordination controller 110 of each imaging device 1 exits the imaging parameter setting process.

Manual Setting Process

A manual setting process in the imaging parameter setting process will now be described with reference to FIG. 6.

Figure 6:
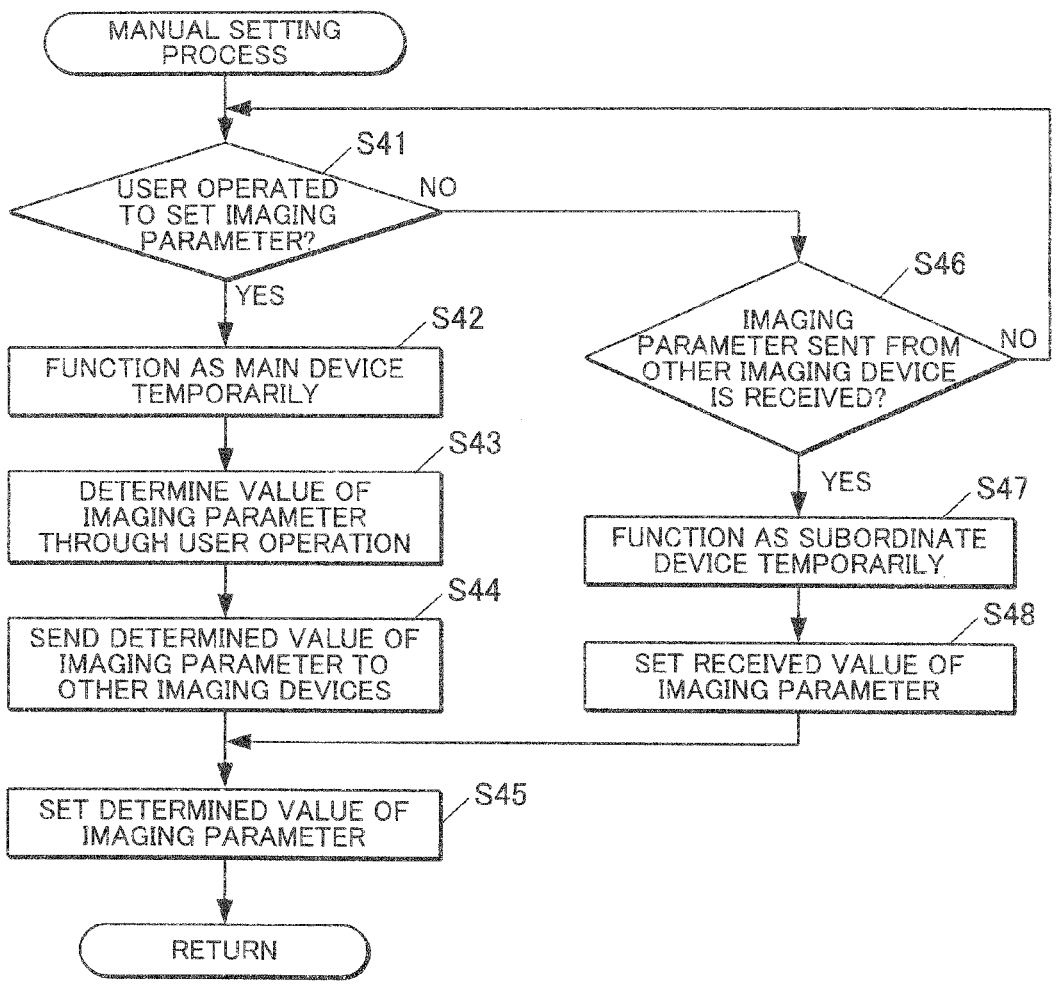
FIG. 6 is a flow chart illustrating exemplary operations performed in a manual setting process in the imaging parameter setting process shown in FIG. 5.

FIG. 6 is a flow chart illustrating exemplary operations performed in the manual setting process.

As shown in FIG. 6, the CPU of the central controller 101 of each imaging device 1 determines whether the operation input unit 107 has undergone a predetermined operation to set the value of an imaging parameter (for example, the ISO speed in the imaging situation 1) (Step S41).

If the operation input unit 107 has undergone the predetermined operation (Step S41: YES), the main device selector 110b of the imaging device 1 that have been operated selects the imaging device 1 as a main device for determining the value of the imaging parameter. The imaging device 1 functions as a tentative main device (Step S42).

The relevant information acquiring unit 110c then acquires the value of the imaging parameter that has been set through a predetermined operation of the operation input unit 107 by a user. The imaging condition determining unit 110d adopts the value, acquired by the relevant information acquiring unit 110c, of the imaging parameter as an imaging condition (Step S43). The coordination controller 110 sends the determined imaging condition (the value of the imaging parameter) to all the other imaging devices 1 through wireless communication links of the wireless processor 108 (Step S44).

Subsequently, the CPU of the central controller 101 sets the value of the imaging parameter determined by the imaging condition determining unit 110d in each section, involved in the setting of the imaging parameter, of the imaging unit 103 (Step S45).

If the operation input unit 107 has not undergone a predetermined operation at Step S41 (Step S41: NO), the coordination controller 110 of each imaging device 1 determines whether the value of the imaging parameter has been received from other imaging devices 1 through wireless communication links of the wireless processor 108 (Step S46).

If the value of the imaging parameter is determined to have been received (Step S46: YES), the imaging device 1 functions as a subordinate imaging device to temporarily determine the value of the imaging parameter. The relevant information acquiring unit 110c acquires the value of the imaging parameter received by the wireless processor 108 (Step S47).

The subordinate imaging devices 1 adopts the value of the imaging parameter determined by the imaging condition determining unit 110d of the main imaging device 1 without any change. The CPU of the central controller 101 sets the value, acquired by the relevant information acquiring unit 110c, of the imaging parameter in each section, involved in the setting of the imaging parameter, of the imaging unit 103 (Step S48).

Main-Unit Matching Process

A main-unit matching process in the imaging parameter setting process will now be described with reference to FIG. 7.

FIG. 7 is a flowchart illustrating exemplary operations performed in the main-unit matching process.

As shown in FIG. 7, the main device selector 110b of each imaging device 1 detects the own state of the imaging device 1 shooting the subject S based on the image data of a live view image generated by the image data processor 104 (Step S51). More specifically, in the case of the imaging parameter of the white balance in the imaging situation 1, the main device selector 110b performs predetermined subject detection (for example, the face or edge detection) based on the image data of the live view image and identifies the position of the common subject S in the composition of the live view image.

The coordination controller 110 of each imaging device 1 then sends the detected own state of the imaging device 1 to all the other imaging devices 1 through wireless communication links of the wireless processor 108 and receives the states of other imaging devices 1 detected thereby (Step S52).

The main device selector 110b of each imaging device 1 evaluates the state of the imaging device 1 shooting the subject S according to the selection mode of the main device specified in the coordination condition table T in association with an imaging parameter (method for evaluating the state of an imaging device 1 shooting the subject S) (Step S53). More specifically, in the case of the imaging parameter of the white balance in the imaging situation 1, the main device selector 110b calculates the distance from the center of the composition to the common subject S for each of the imaging devices 1.

The main device selector 110b of each imaging device 1 determines whether the own state of the imaging device 1 shooting the subject S is better than the state of any other (Step S54). More specifically, in the case of the imaging parameter of the white balance in the imaging situation 1, the main device selector 110b of each imaging device 1 determines whether the imaging device is shooting the common subject S such that the subject is positioned closer to the center of the composition in the imaging devices 1.

If the own state of the imaging device 1 shooting the subject S is determined to be better than the state of any other at Step S54 (Step S54: YES), the main device selector 110b selects the imaging device 1 as a main device for determining the value of the imaging parameter. The selected imaging device 1 functions as a temporary main device (Step S55).

The relevant information acquiring unit 110c then acquires the information indicating the state of the common subject S (Step S56). More specifically, in the case of the imaging parameter of the white balance in the imaging situation 1, the relevant information acquiring unit 110c acquires a value measured at the time of shooting the common subject S (for example, the color of the subject S) as the information indicating the state of the common subject S. The coordination controller 110 then sends the acquired information indicating the state of the common subject S (for example, the measurement of the color of the subject S) to all the other imaging devices through wireless communication links of the wireless processor 108 (Step S57)

The imaging condition determining unit 110d then determines the value of the imaging parameter (for example, the setting of the white balance) based on information indicating the state of the common subject S (for example, the measurement of the color of the subject S) that has been acquired by the relevant information acquiring unit 110c (Step S58).

The CPU of the central controller 101 sets the value of the imaging parameter that has been determined by the imaging condition determining unit 110d in each section, such as the imaging unit 103, involved in the setting of the imaging parameter (Step S59).

If the own state of the imaging device 1 shooting the subject S is not determined to be better than the state of any other at Step S54 (Step S54: NO), the imaging device 1 functions as a subordinate imaging device to temporarily determine the value of the imaging parameter (Step S60).

The wireless processor 108 receives the information indicating the state of the common subject S (for example, the measurement of the color of the subject S) from the main device via wireless communications. The relevant information acquiring unit 110c acquires the information indicating the state of the common subject S (Step S61).

The imaging condition determining unit 110d then determines the value of the imaging parameter (for example, the setting of the white balance) based on the information indicating the state of the common subject S (for example, the measurement of the color of the subject S) that have been acquired by the relevant information acquiring unit 110c. (Step S62).

The CPU of the central controller 101 sets the value of the imaging parameter that has been determined by the imaging condition determining unit 110d in each unit, such as the imaging unit 103, involved in the setting of the imaging parameter (Step S63).

Alternatively, the main imaging device 1 may send the value of the imaging parameter (for example, the value of the while balance) that has been determined at Step S58 to all the other imaging devices 1, in place of the information indicating the state of the common subject S. In this case, the subordinate devices 1 do not determine the imaging condition based on the information indicating the state of the common subject S that has been received from the main device and adopts the imaging condition (for example, the value of while balance) that has been determined by the imaging condition determining unit 110d of the main imaging device 1.

Majority-Voting Process

A majority-voting process in the imaging parameter setting process will now be described with reference to FIG. 8.

FIG. 8 is a flowchart illustrating exemplary operations performed in the majority-voting process.

As shown in FIG. 8, each imaging device 1 tentatively determines the value of an imaging parameter (for example, the aperture in the imaging situation 1) (Step S71). More specifically, each imaging device 1 acquires, for example, the value of an imaging parameter automatically determined based on the measurement of the state of the subject, the value, specified through a predetermined operation of the operation input unit 107 by a user, of an imaging parameter, or the value of an imaging parameter already set and adopts the value as a tentative value of the imaging parameter.

The coordination controller 110 of each imaging device 1 then sends the tentative value of the imaging parameter to all the other imaging devices 1 through the wireless communication links of the wireless processor 108 and receives the value, which has been tentatively determined by other imaging devices 1, of the imaging parameter (Step S72).

The relevant information acquiring unit 110c of each imaging device 1 acquires the value, which has been tentatively determined, of the imaging parameter for the imaging device 1 and the values, that have been received through the wireless communications of the wireless processor 108, of the imaging parameter for the imaging devices 1 other than the imaging device 1 (Step S73). The imaging condition determining unit 110d of each imaging device 1 then takes a vote on the values, which have been tentatively determined by all the imaging devices 1 and acquired by the relevant information acquiring unit 110c, of the imaging parameter to adopt the tentative value, that occurs most frequently, of the imaging parameter as the value of the imaging parameter (Step S74).

The CPU of the central controller 101 of each imaging device 1 then sets the value of the imaging parameter determined by the imaging condition determining unit 110d in each section, such as the imaging unit 103, involved in the setting of the imaging parameter (Step S75).

A similar process is performed by all the imaging devices 1. Since each of parameters subject to the majority-voting process is common across all the imaging devices 1, the imaging parameter set by all the imaging devices 1 have the same values.

Averaging Process

An averaging process in the imaging parameter setting process will now be described with reference to FIG. 9.

FIG. 9 is a flow chart illustrating exemplary operations performed in the averaging process.

As shown in FIG. 9, each imaging device 1 tentatively determines the value of an imaging parameter (for example, the exposure time in the imaging situation 1) (Step S81). More specifically, each imaging device 1 acquires, for example, the value of an imaging parameter automatically determined based on the measurement of the state of the subject, the value, specified through a predetermined operation of the operation input unit 107 by a user, of an imaging parameter, or the value of an imaging parameter already set and adopts the value as a tentative value of the imaging parameter.

The coordination controller 110 of each imaging device 1 then sends the tentative value of the imaging parameter to all the other imaging devices 1 through the wireless communication links of the wireless processor 108 and receives the value, which has been tentatively determined by other imaging devices 1, of the imaging parameter (Step S82).

The relevant information acquiring unit 110c of each imaging device 1 acquires the value, which has been tentatively determined, of the imaging parameter for the imaging device 1 and the values, that have been received through the wireless communications of the wireless processor 108, of the imaging parameter for the imaging devices 1 other than the imaging device 1 (Step S83). The imaging condition determining unit 110d of each imaging device 1 then averages the values, which have been tentatively determined by all the imaging devices 1 and acquired by the relevant information acquiring unit 110c, of the imaging parameter to adopt the average as the value of the imaging parameter (Step S84).

The CPU of the central controller 101 of each imaging device 1 then sets the value of the imaging parameter determined by the imaging condition determining unit 110d in each section, such as the imaging unit 103, involved in the setting of the imaging parameter (Step S85).

A similar process is performed by all the imaging devices 1. Since each of parameters subject to the averaging process is common across all the imaging devices 1, the imaging parameter set by all the imaging devices 1 have the same values.

As described above, the imaging control system 100 according to the embodiment includes the imaging devices 1 that synchronously shoot the common subject S. The imaging control system 100 selects an imaging device 1 that functions as a main device in the process for coordinating the imaging conditions of the imaging devices 1 based on the state of each imaging device 1 shooting a common subject S. The imaging control system 100 then acquires the shooting information (main device-related information) (for example, the information indicating the state of the common subject S) which is acquired at the time of shooting of the common subject S by the selected main imaging device 1 or determined at the time of setting an imaging condition of the imaging device 1. The imaging control system 100 then determines the value of an imaging condition applicable to the imaging devices 1 (for example, the white balance). This scheme allows the imaging control system 100 to select a main imaging device 1 properly from the imaging devices 1 even if the imaging devices 1 shooting the same common subject S do not determine an imaging condition of the subject S under the same condition. In addition, the imaging control system 100 determines the value of an imaging condition applicable to the imaging devices 1 based on the shooting information (main device-related information) of the selected main device. This scheme allows imaging devices 1 to image the common subject S under a better imaging condition.

The imaging control system 100 selects an imaging device 1 shooting the common subject S at a position closer to the center in its composition, an imaging device 1 shooting the common subject S at a shorter distance, or an imaging device 1 shooting the common subject S with the largest area in its composition as a main device from the imaging devices 1. This scheme allows an imaging device 1 that shoot the common subject S in the state better than any other devices to be selected as a main device from the imaging devices 1.

The imaging control system 100 sequentially selects a main imaging device 1 from the imaging devices 1, sequentially acquires the shooting information (main device-related information) of the sequentially selected main imaging device 1, and sequentially determines the value of an imaging condition applicable to the imaging devices 1 based on the sequentially acquired shooting information (main device-related information). This scheme allows a main imaging device 1 to be identified properly from the imaging devices 1 and thus allows imaging devices 1 to image the subject properly even in an environment in which, for example, the state of the subject S or an imaging situation varies every moment.

The imaging control system 100 acquires the information indicating the state of the common subject S that has been acquired at the time of shooting the common subject S by the subordinate imaging devices 1 and then determines the value of an imaging condition applicable to the imaging devices 1 based on the information indicating the state of the common subject S acquired for all the imaging devices 1, including the main device and the subordinate devices. This scheme allows the imaging control system 100 to determine the value of an imaging condition applicable to the imaging devices 1 properly in consideration of the information indicating the state of the common subject S acquired at the time of shooting the common subject S not only by a main imaging device but also by the subordinate imaging devices 1. More specifically, the imaging control system 100 acquires a value measured by each imaging device 1 at the time of shooting the common subject S as the information indicating the state of the common subject S and identifies a representative value of the measurements of all the imaging devices 1 to determine the value of an imaging condition applicable to the imaging devices 1. This scheme allows the imaging devices 1 to shoot the common subject S under a better imaging condition.

The scope of the present invention should not be limited to the above embodiment and various changes and modifications can be made without departing from the spirit and scope of the present invention.

For example, the coordination condition table T according to the above embodiment may contain a coordination condition for changing an imaging condition set individually by each imaging device 1 in response to an imaging situation into an imaging condition suitable for synchronously shooting the common subject S for each of the imaging conditions. In this case, the imaging condition determining unit 110*d* may change an imaging condition set individually by each imaging device 1 in response to an imaging situation into an imaging condition suitable for synchronously shooting the common subject S based on a coordination condition specified in the coordination condition table T in association with the imaging situation, identified by the imaging situation specifier 110*a*, of the common subject S.

The imaging condition set individually by each imaging device 1 in response to an imaging situation includes a coordination condition for correcting, for example, an exposure adjustment program chart to have an appropriate exposure. The coordination condition is specified in the coordination condition table T in association with each of imaging situations. With reference to the coordination condition table T, the imaging condition determining unit 110*d* determines the content of an program chart (for example, exposure time or aperture) to achieve an appropriate exposure in response to the imaging situation identified by the imaging situation specifier 110*a*.

In the above embodiment, when any one of the imaging devices 1 shooting the common subject S sends the state of the imaging device through the wireless processor 108, the imaging device 1 may direct the wireless processor 108 to sends a control signal to all the other imaging devices 1. The control signal directs each imaging device 1 to compare its own state with the state of other imaging devices or determine whether the imaging device 1 functions as a main or subordinate device during the setting of an imaging condition of the common subject S.

The configuration of the imaging control system 100 according to the above embodiment should not be limited to this configuration and any other configuration may be used. The imaging device 1 is an exemplary control device and may be modified as appropriate. Alternatively, a dedicated controller, such as a smart phone or tablet terminal, may be provided in addition to the imaging device 1.

More specifically, the dedicated controller receives the state of the imaging devices 1 shooting the common subject S from the wireless processor, compares the received states of the imaging devices 1, selects an imaging device that functions as a main device during the setting of an imaging condition of the common subject S in accordance with the result of comparison, and then selects other imaging devices 1 that has not been selected as a main device as subordinate devices. The dedicated controller sends a command to function as a main device to the main imaging device 1 and a command to function as a subordinate device to the subordinate devices through the wireless processor. The dedicated controller may send a command indicating the timing of synchronous shooting to the imaging devices 1 shooting the common subject S through the wireless processor.

In the above embodiment, the selecting means, the acquiring means and the determining means are put under the control of the central controller 101 and their functions are achieved by driving the main device selector 110*b*, the relevant information acquiring unit 110*c*, and the imaging condition determining unit 110*d*. Alternatively, the central controller 101 may execute predetermined programs to achieve these functions.

In other words, programs, including selecting routines, acquiring routines, and determining routines, are stored in a program memory (not shown). The selecting routine may allow the CPU of the central controller 101 to function as a means to select an imaging device 1 that functions as a main device for coordinating an imaging condition of each imaging device 1 from the imaging devices 1 based on the state of each imaging device 1 shooting the common subject S. The acquiring routine may allow the CPU of the central controller 101 to function as a means to acquire the shooting information (main device-related information) acquired by the main imaging device 1 at the time of shooting of the common subject S or determined at the time of setting an imaging condition of the imaging device 1. The determining routine may allow the CPU of the central controller 101 to function as a means to determine the value of an imaging condition applicable to the imaging devices 1 based on the acquired shooting information (main device-related information).

ROM, hard disk, nonvolatile memory, such as flash memory, and potable recording media, such as CD-ROM, may be used as computer readable media holding the programs executing the above processing.

The above embodiment is an exemplary embodiment to achieve (execute or configure) various functions (processes, or means) to achieve the above effects. Other methods may be used to achieve these functions.

The whole or part of each function may be achieved by a processor that operates in response to a command from a program stored in memory or by electronic circuits, such as IC or LSI. In either case, a specific configuration can be readily achieved by those skilled in art based on the flow charts and the functional block diagrams provided in this specification. For example, a branching statement in a flow chart can be achieved by a comparator that compares input data and a selector that selects a process in accordance with the result of comparison (details are omitted).

The functions (processes or means) necessary to produce the above effects may be divided arbitrarily. The following paragraphs provide examples.

EXAMPLE 1

An imaging device that shoots a common subject in synchronization with other imaging devices includes an imaging unit, a wireless processing unit and a processor.

The processor receives states of the other imaging devices shooting the common subject through the wireless processing unit, compare an own state of the imaging device with the received states of the other imaging devices, and determine whether the imaging device functions as a main device or a subordinate device for setting an imaging condition in accordance with the comparison.

When the processor determines that the imaging device functions as the main device, the processor sends imaging information acquired or determined by the imaging device for shooting the common subject to the subordinate devices through the wireless processing unit.

When the processor determines that the imaging device functions as the subordinate device, the processor sets the imaging condition in the imaging device based on the imaging information received from the main device through the wireless processing unit and the imaging unit images the common subject synchronously.

EXAMPLE 2

In the imaging device, the processor sends the own state of the imaging device shooting the common subject through the wireless processing unit to the other imaging devices to allow each of the other imaging devices to compare the states of the imaging devices including the sent state of the imaging device and to determine whether each of the other imaging devices functions as the main device or the subordinate device for setting the imaging condition of the common subject.

EXAMPLE 3

In the imaging device, when the result of the comparison indicates that the own state of the imaging device is more suitable for determining the imaging condition of the common subject than the state of any other imaging device, the processor determines that the imaging device functions as the main device; otherwise the processor determines that the imaging device functions as the subordinate device.

EXAMPLE 4

In the imaging device, the other imaging devices preliminarily shoot the common subject before synchronized shooting of the imaging devices.

The processor receives the states of the other imaging devices shooting the common subject, the states being given by the preliminary shooting, and then compares the own state of the imaging device with the states of the other imaging devices.

When the comparison indicates that the own state of the imaging device shooting the common subject is better than the state of any other imaging device, the processor determines that the imaging device functions as the main device.

EXAMPLE 5

In the imaging device, when the comparison indicates that the imaging device is shooting the common subject at a position closer to the center of an imaging range, the processor determines that the imaging device functions as the main device.

EXAMPLE 6

In the imaging device, when the comparison indicates that the imaging device is shooting the common subject from a shorter distance, the processor determines that the imaging device functions as the main device.

EXAMPLE 7

In the imaging device, when the comparison indicates that the imaging device is shooting the common subject with a largest area in an imaging range, the processor determines that the imaging device functions as the main device.

EXAMPLE 8

In the imaging device, when the processor determines that the imaging device functions as the main device, the processor sends subject information indicating a state of the common subject to the subordinate devices as the imaging information, the state being acquired by the main device for shooting the common subject.

When the processor determines that the imaging device functions as the subordinate device, the imaging device individually sets the imaging condition based on the subject information received from the main device.

EXAMPLE 9

In the imaging device, when the processor determines that the imaging device functions as the main device, the processor sends the imaging condition determined based on a state of the common subject to the subordinate devices as the imaging information, the state being acquired by the main device for shooting the common subject.

When the processor determines that the imaging device functions as the subordinate device, the processor sets the imaging condition received from the main device as the imaging condition of the subordinate device.

EXAMPLE 10

In the imaging device, when the processor determines that the imaging device functions as the main device, the processor determines the imaging condition of each subordinate device based on a state of the common subject, the state being acquired by the main device for shooting the common subject, and sends the imaging condition to each subordinate device.

EXAMPLE 11

In the imaging device, when the processor determines that the imaging device functions as the main device, the processor determines the imaging condition of white balance based on a color state of the common subject, the color state being acquired by the main device for shooting the common subject.

EXAMPLE 12

In the imaging device, when the processor determines that the imaging device functions as the main device, the processor receives subject information indicating a state of the common subject, the state being acquired by each subordinate device for shooting the common subject, and determines and sends an imaging condition to be set by each subordinate device based on the received subject information.

EXAMPLE 13

In the imaging device, when the processor determines that the imaging device functions as the main device, the processor receives a measurement of the common subject, the measurement being acquired by each subordinate device for shooting the common subject, determines a representative value of the measurements including the received measurement, and sends the determined representative value or the imaging condition determined based on the determined representative value as the imaging information to the subordinate devices.

EXAMPLE 14

In the imaging device, the processor sequentially receives the states of the other imaging devices shooting the common subject through the wireless processing unit, sequentially compares the own state with the received states of the other imaging devices, and sequentially determines whether the imaging device functions as the main device or the subordinate device for setting the imaging condition of the common subject based on the comparison.

EXAMPLE 15

An imaging controller that controls synchronous imaging of a common subject by imaging devices includes a wireless processing unit and a processor.

The processor receives states of the imaging devices shooting the common subject through the wireless processing unit, compares the received states of the imaging devices, selects the imaging device that functions as a main device for setting an imaging condition of the common subject from the imaging devices, and determines other imaging devices that are not selected as the main device as subordinate devices.

The processor sends a command to function as the main device to the imaging device that is selected as the main device through the wireless processing unit.

The processor sends a command to function as the subordinate device to each of the other imaging devices that are determined as the subordinate devices through the wireless processing unit.

EXAMPLE 16

In the imaging controller, the processor sends a command indicating timing of synchronous shooting to the imaging devices shooting the common subject through the wireless processing unit.

EXAMPLE 17

A method for shooting a common subject in synchronization with imaging devices includes the steps of:

sending and receiving a state of each imaging device shooting the common subject to and from other imaging devices;

comparing the states of the imaging devices, the states being sent and received; and selecting a main device and subordinate devices for setting an imaging condition of the common subject based on the comparison.

The main device sends imaging information acquired or determined by the main device for shooting the common subject to the subordinate devices.

Each subordinate device sets an imaging condition of the subordinate device based on the imaging information received from the main device and images the common subject synchronously with the imaging unit.

EXAMPLE 18

An imaging system shooting a common subject in synchronization with imaging devices includes:

a communication unit which sends and receives a state of each imaging device shooting the common subject to and from other imaging devices;

a comparison unit which compares the states of the imaging devices, the states being sent and received;

a selection unit which selects a main device and subordinate devices for setting an imaging condition of the common subject based on the comparison;

a transmission unit which sends imaging information acquired or determined by the main device for shooting the common subject to the subordinate devices when the imaging device functions as the main device; and a setting unit which sets the imaging condition of the subordinate device based on the imaging information received from the main device and which images the common subject synchronously with the imaging unit when the imaging device functions as the subordinate device.

What is claimed is:

1. An imaging device that shoots a common subject in synchronization with another imaging device, the imaging device comprising:
   an imaging section;
   a wireless processor; and
   a processor,
   wherein the imaging device and the another imaging device preliminarily shoots the common subject before synchronized shooting of the imaging devices is performed, and the processor (i) receives a state of the another imaging device shooting the common subject through the wireless processor, the state being given by the preliminary shooting, (ii) compares an own state of the imaging device shooting the common subject with the received state of the another imaging device, the own state of the imaging device being given by the preliminary shooting, (iii) determines whether the imaging device functions as a main device or a subordinate device for setting an imaging condition in accordance with a result of the comparison, and (iv) sends the own state of the imaging device shooting the common subject through the wireless processor to the another imaging device to allow the another imaging device to compare the states of the imaging devices including the sent state of the imaging device and to determine whether the another imaging device functions as the main device or the subordinate device for setting the imaging condition of the common subject,
   wherein, when the result of the comparison indicates that the own state of the imaging device shooting the common subject is more suitable for determining the imaging condition of the common subject than the state of the another imaging device, the processor determines that the imaging device functions as the main device, and otherwise determines that the imaging device functions as the subordinate device,
   wherein, when the processor determines that the imaging device functions as the main device, the processor sends imaging information acquired or determined by the imaging device for shooting the common subject to the subordinate device through the wireless processor, and
   wherein, when the processor determines that the imaging device functions as the subordinate device, the processor sets the imaging condition in the imaging device based on the imaging information received from the main device through the wireless processor and the imaging section images the common subject synchronously.

2. The imaging device according to claim 1, wherein, when the result of the comparison indicates that the imaging device is shooting the common subject at a position closer to a center of an imaging range, the processor determines that the imaging device functions as the main device.

3. The imaging device according to claim 1, wherein, when the result of the comparison indicates that the imaging device is shooting the common subject from a shorter distance, the processor determines that the imaging device functions as the main device.

4. The imaging device according to claim 1, wherein, when the result of the comparison indicates that the imaging device is shooting the common subject with a largest area in an imaging range, the processor determines that the imaging device functions as the main device.

5. The imaging device according to claim 1, wherein, when the processor determines that the imaging device functions as the main device, the processor sends subject information indicating a state of the common subject to subordinate devices as the imaging information, the state being acquired by the main device for shooting the common subject, and wherein, when the processor determines that the imaging device functions as the subordinate device, the imaging device individually sets the imaging condition based on the subject information received from the main device.

6. The imaging device according to claim 1, wherein, when the processor determines that the imaging device functions as the main device, the processor sends the imaging condition determined based on a state of the common subject to the subordinate device as the imaging information, the state being acquired by the main device for shooting the common subject, and wherein, when the processor determines that the imaging device functions as the subordinate device, the processor sets the imaging condition received from the main device as the imaging condition of the subordinate device.

7. The imaging device according to claim 6, wherein, when the processor determines that the imaging device functions as the main device, the processor determines the imaging condition of the subordinate device based on a state of the common subject, the state being acquired by the main device for shooting the common subject, and sends the imaging condition to the subordinate device.

8. The imaging device according to claim 6, wherein, when the processor determines that the imaging device functions as the main device, the processor determines the imaging condition of white balance based on a color state of the common subject, the color state being acquired by the main device for shooting the common subject.

9. The imaging device according to claim 6, wherein, when the processor determines that the imaging device functions as the main device, the processor receives subject information indicating a state of the common subject, the state being acquired by the subordinate device for shooting the common subject, and determines and sends an imaging condition to be set by the subordinate device based on the received subject information.

10. The imaging device according to claim 1, wherein, when the processor determines that the imaging device functions as the main device, the processor receives a measurement of the common subject, the measurement being acquired by the subordinate device for shooting the common subject, determines a representative value of measurements including the received measurement, and sends the determined representative value or the imaging condition determined based on the determined representative value as the imaging information to the subordinate device.

11. The imaging device according to claim 1, wherein the processor sequentially receives the state of the another imaging device shooting the common subject through the wireless processor, sequentially compares the own state with the sequentially received states of the another imaging device, and sequentially determines whether the imaging device functions as the main device or the subordinate device for setting the imaging condition of the common subject based on a result of the sequential comparisons.

12. An imaging controller that controls synchronous imaging of a common subject by imaging devices, the imaging controller comprising:

a wireless processor; and a processor, wherein the processor (i) receives states of the imaging devices shooting the common subject through the wireless processor, the states of the imaging devices being given by the imaging devices performing preliminary shooting of the common subject before synchronized shooting of the imaging devices is performed, and (ii) compares the received states of the imaging devices, wherein, when a result of the comparison indicates that the received state of an imaging device from among the imaging devices is more suitable for determining an imaging condition of the common subject than the received state of another imaging device from among the imaging devices, the processor selects the imaging device as a main device for setting an imaging condition of the common subject, and selects the another imaging device that is not selected as the main device as a subordinate device, wherein the processor sends a command to function as the main device to the imaging device that is selected as the main device through the wireless processor, wherein the processor sends a command to function as the subordinate device to the another imaging device that is determined as the subordinate device through the wireless processor, wherein the main device sends imaging information acquired or determined by the main device for shooting the common subject to the subordinate device, and wherein the subordinate device sets an imaging condition of the subordinate device based on the imaging information received from the main device, and images the common subject synchronously.

13. The imaging controller according to claim 12, wherein the processor sends a command indicating a timing of synchronous shooting to the imaging devices shooting the common subject through the wireless processor.

14. A method of an imaging device for shooting a common subject in synchronization with another imaging device, the method comprising:

receiving, from the another imaging device, a state of the another imaging device shooting the common subject, the state of the another imaging device being given by the another imaging device preliminarily shooting the common subject before synchronized shooting of the imaging devices is performed;

comparing an own state of the imaging device shooting the common subject with the received state of the another imaging device; the own state of the imaging device being given by the imaging device preliminarily shooting the common subject before synchronized shooting of the imaging device is performed;

determining whether the imaging device functions as a main device or a subordinate device for setting an imaging condition of the common subject based on a result of the comparison; and sending the own state of the imaging device shooting the common subject through the wireless processor to the another imaging device to allow the another imaging device to compare the states of the imaging devices including the sent state of the imaging device and to determine whether the another imaging device functions as the main device or the subordinate device for setting the imaging condition of the common subject, wherein, when the result of the comparison indicates that the own state of the imaging device shooting the common subject is more suitable for determining the imaging condition of the common subject than the received state of the another imaging device, the determining determines that the imaging device functions as the main device, and otherwise determines that the imaging device functions as the subordinate device, wherein the main device sends imaging information acquired or determined by the main device for shooting the common subject to the subordinate device, and wherein the subordinate device sets an imaging condition of the subordinate device based on the imaging information received from the main device and images the common subject synchronously with an imaging section thereof.

15. An imaging system for shooting a common subject in synchronization by a plurality of imaging devices, the system comprising:

a first imaging device; and a second imaging device, wherein:

the first imaging device receives, from the second imaging device, a state of the second imaging device shooting the common subject, the state of the second imaging device being given by the second imaging device preliminarily shooting the common subject before synchronized shooting of the plurality of imaging devices is performed;

the first imaging device compares an own state of the first imaging device with the received state of the second imaging device; and the first imaging device determines whether the first imaging device functions as a main device or a subordinate device for setting an imaging condition of the common subject based on a result of the comparison;

wherein, when the result of the comparison indicates that the own state of the first imaging device shooting the common subject is more suitable for determining the imaging condition of the common subject than the received state of the second imaging device, the first imaging device determines that the first imaging device functions as the main device, and otherwise determines that the first imaging device functions as the subordinate device, wherein, when the first imaging device determines that the first imaging device functions as the main device, the first imaging device sends imaging information acquired or determined by the first imaging device for shooting the common subject to the subordinate device; and wherein, when the first imaging device determines that the first imaging device functions as the subordinate device, the first imaging device sets the imaging condition of the first imaging device based on the imaging information received from the main device and images the common subject synchronously with an imaging unit thereof.

* * * * *